United States Patent
Schukin et al.

(10) Patent No.: US 7,520,722 B2
(45) Date of Patent: *Apr. 21, 2009

(54) METHOD FOR INCREASING A BLADE PERFORMANCE (VARIANTS)

(75) Inventors: Ilya Lvovich Schukin, Moscow (RU); Andrei Lev Chtchoukine, Moscow (RU); Semen Mikhailovich Zelvinsky, Moscow (RU); Jury Mikhailovich Lipnitsky, Moscow (RU)

(73) Assignee: Ilya Lvovich Shchukin, Moscow (RU)

( * ) Notice: Subject to any disclaimer, the term of this patent is extended or adjusted under 35 U.S.C. 154(b) by 152 days.

This patent is subject to a terminal disclaimer.

(21) Appl. No.: 10/582,019

(22) PCT Filed: Feb. 11, 2004

(86) PCT No.: PCT/RU2004/000047

§ 371 (c)(1),
(2), (4) Date: Jun. 8, 2006

(87) PCT Pub. No.: WO2005/054685

PCT Pub. Date: Jun. 16, 2005

(65) Prior Publication Data

US 2007/0113403 A1    May 24, 2007

(30) Foreign Application Priority Data

Dec. 8, 2003    (RU) .............................. 2003135481

(51) Int. Cl.
*B64C 11/16*    (2006.01)
(52) U.S. Cl. ........................ 416/1; 416/91; 416/236 R
(58) Field of Classification Search ............... 416/1, 416/90 A, 91, 236 R; 415/914
See application file for complete search history.

(56) References Cited

U.S. PATENT DOCUMENTS 6,203,269 B1    3/2001    Lorber et al.
7,234,921 B2 *  6/2007    Shchukin et al. ............... 416/1

FOREIGN PATENT DOCUMENTS

EP        0564662        10/1993

(Continued)

*Primary Examiner*—Edward Look
*Assistant Examiner*—Dwayne J White
(74) *Attorney, Agent, or Firm*—Volpe and Koenig PC

(57) ABSTRACT

The invention relates to machine building in particular to blade machines for air injection, in particular to fans and air blowers, and also to blades of different propulsion devices. The inventive method for increasing the blade (1) performance consists in producing a blade (1) in the form of a wing and in carrying out the boundary layer suction on the blade 1 surface on the opposite side with respect to the incoming air flow through a system of slotted holes (4). The blade (1) is provided with a thick airfoil profile. The air suction is carried out through the system of slotted holes (4) embodied along the blade (1) and into cavities (5) which are embodied under said holes (4) along the latter and each of which is provided with a central longitudinal hollow body arranged therein, said body forming an annular channel (7) in each cavities (5) in such a way that a vortex-like flow is generated by the incoming air flow in said channel. The air is sucked out from the cavities (5) and the central bodies (6) through branch channels (8). The latter are used to discharge air outside of the blade (1). The air flowing-off along the cavities (5) and along the blade 1 is limited within the cavities (5) by mounting partitions and on an external surface of the blade (1)—by mounting ribs (9). In another embodiment of the method, the cavity is embodied without the central body (6). As a result, the invention makes it possible to increase the blade performance.

8 Claims, 4 Drawing Sheets

FOREIGN PATENT DOCUMENTS

| | | |
|---|---|---|
| GB | 2186033 | 8/1987 |
| RU | 2002087 | 10/1993 |
| RU | 2015941 C1 | 7/1994 |
| RU | 2015942 | 10/1994 |
| RU | 2032595 | 4/1995 |
| SU | 1460433 | 2/1989 |
| SU | 1665882 | 7/1991 |
| WO | WO 95/32122 | 11/1995 |

* cited by examiner

METHOD FOR INCREASING A BLADE PERFORMANCE (VARIANTS)

FIELD OF THE INVENTION

The invention relates to mechanical engineering, in particular to blade machines for air injection, in particular to fans and air blowers, and also to blades of different propulsion devices (in helicopters, airplanes, etc.).

BACKGROUND OF THE INVENTION

Known is a method for increasing a blade performance, consisting in producing blades in the form of a wing and mounting them around a rotor shaft while carrying out the suction of air in a blade shank (foot) region (blade section adjacent to the rotor shaft), draining-off said air to a leading edge zone of the blade, followed by blowing the air out along an upper surface of the blade (see U.S. Pat. No. 6,203,269, IPC F01D 5/14, Mar. 20, 2001).

The present method allows reduction in separation of the air flow at the upper surface of the blade due to increase of the air flow velocity. However, the present method is ineffective which is connected with large energy expenditure for blowing air in along the blade surface.

The closest to the invention in the technical essence and the result to be accomplished is a method for increasing a rotor blade performance, consisting in producing rotor blades in the form of a wing and radial mounting said blades around a rotor shaft, and carrying out the boundary layer suction on a blade surface on the opposite side with respect to the incoming air flow through a system of slotted holes (see Russian Federation Patent No. 2,002,087, IPC F02K 3/00, Oct. 30, 1993).

The disadvantage of the present method for increasing a rotor blade performance is that such a control of the boundary layer involves a complicated design and high energy expenditure for suction of the flow, which is associated with a large resistance of manifolds connecting the slotted holes to a low pressure source in the blade.

SUMMARY OF THE INVENTION

It is a technical problem to be solved by the present invention to increase a blade performance, including blades in an air supercharger or a propulsion device rotor, because of providing the without a break of flow of the air around blades produced in the form of a wing with a thick airfoil profile, and because of reducing the energy expenditure for controlling a boundary layer by means of the boundary layer suction from a blade surface on the opposite side with respect to the incoming air flow.

Said problem is solved by that, in a method for increasing a blade performance, there are the steps of producing a blade in the form of a wing, and on a side opposite to an incoming air flow; carrying out the boundary layer suction through a system of slotted holes, said blade being provided with a thick airfoil profile, the boundary layer suction being carried out through the system of the slotted holes embodied along the blade and into cavities embodied under said holes along the latter and provided with a central longitudinal hollow body in each cavity, said body forming an annular channel in each cavity to generate a vortex-like flow by the incoming air flow in said channel, carrying out the air suction from the cavity and central bodies through branch channels, and discharging air from the branch channels outside of the blade, wherein the flowing-off of the air flow along the cavities and along the blade is limited within the cavities by mounting partitions and on an external surface of the blade—by mounting ribs.

Air can be removed from the branch channels by centrifugal forces and the pressure difference created in such a case between the blade shank and the blade end during rotation of the blade radially mounted with respect to a blade rotation axis, said removal taking place through an outlet channel or opening to environment embodied in the blade at the side of its end.

Air can be pumped out from the branch channels by means of a suction member, for example, a fan or an ejector.

Air can be blown into the vortex-like air flow in an annular channel of cavities.

Control of the air suction can be carried out by mounting air flow control members at outlets of cavities and central bodies or at outlets of branch channels.

Accordingly to another aspect of the invention said problem is solved in a method for increasing a blade performance, wherein there are the steps of producing a blade in the form of a wing, and on a side opposite to an incoming air flow, carrying out the boundary layer suction through a system of slotted holes, said blade being provided with a thick airfoil profile, the air suction being carried out through the system of the slotted holes embodied along the blade and into cavities embodied under said holes along the latter to generate a vortex-like flow by the incoming air flow in said cavities, carrying out the air suction from the cavities through branch channels, and discharging air from the branch channels outside of the blade, wherein the flowing-off of the air flow along the cavities and along the blade is limited within the cavities by mounting partitions and on an external surface of the blade—by mounting ribs.

Air can be sucked out from a branch channel by centrifugal forces and the pressure difference created in such a case between the shank and end of the blades during rotation of the radially mounted blades about a shaft, said suction taking place through an outlet channel or opening embodied in the blades at the side of their end.

Air can be sucked out from the branch channels by means of a suction member, for example, a fan or an ejector.

Air can be blown into the vortex-like air flow going into cavities.

Control of the air suction can be carried out by mounting air flow control members at outlets of cavities or branch channels.

The analysis of the blade operation shows that, when the air flow passes around the blade airfoil profile, a flow with a positive pressure gradient is realized at the blade surface on the side of the incoming flow closer to the trailing edge of the blade, said positive pressure gradient flow preventing the air motion within a region of the boundary layer where velocities are relatively small. The result of such an action can be break of flow from the surface in the trailing edge of the blade and consequently significant increase in the aerodynamic resistance of the blade section at reduction in the lift force.

To improve aerodynamic characteristics of the blade section, it is possible to enhance a velocity of air that passes around the blade surface on the side of the incoming flow. One way to accelerate the air flow that passes around this wing surface is to suck the boundary layer which allows the flow to overcome the positive pressure gradients without break of flow at a curvilinear upper (in case of a helicopter rotor) surface of the blade.

Embodiment of the blades with the above-mentioned system of cavities—that include central bodies—and branch channels allows significant reduction in energy expenditure for suction of the boundary layer, and as a consequence, improvement in aerodynamic blade characteristics accompanied with increase in the lift force created by the blade. Further functionality concerning with energy expenditure reduction is accomplished due to limiting the longitudinal overflow of the sucked air along cavities and limiting the air flow along external surfaces of the blades.

There are two possible ways of production of a low pressure in the branch channels. It is economically profitable to use the centrifugal force that acts to the sucked air within the branch channels to create conditions for sucking said air from the cavities and central bodies. If the centrifugal force is insufficiently, it may be reasonable to carry out the forced air suction from the branch channels, for example, using a fan, an ejector or any other suction member.

BEST METHOD OF CARRYING OUT THE INVENTION

Figure 1:
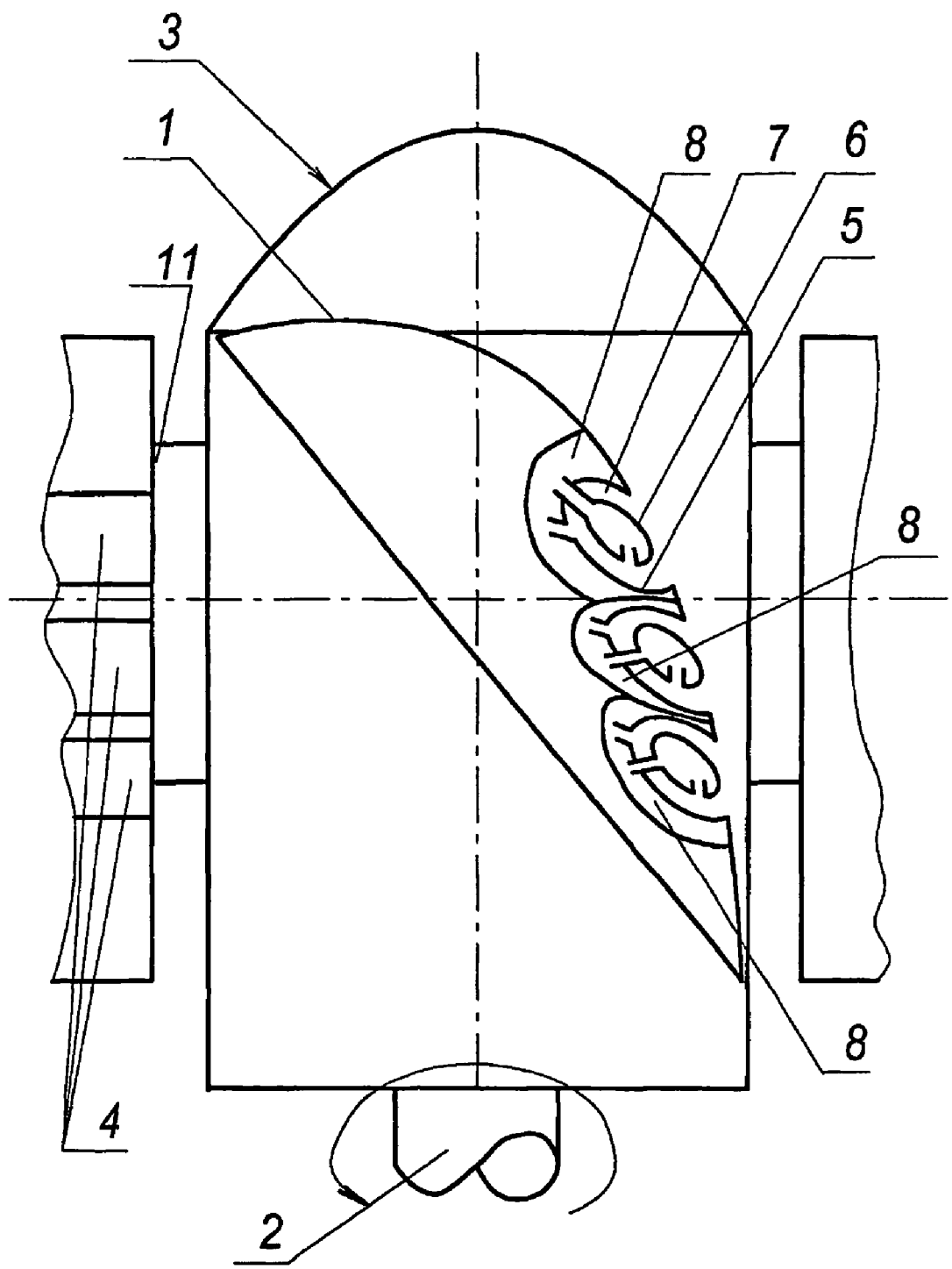
FIG. 1 illustrates a cross section of a rotor blade.
Figure 2:
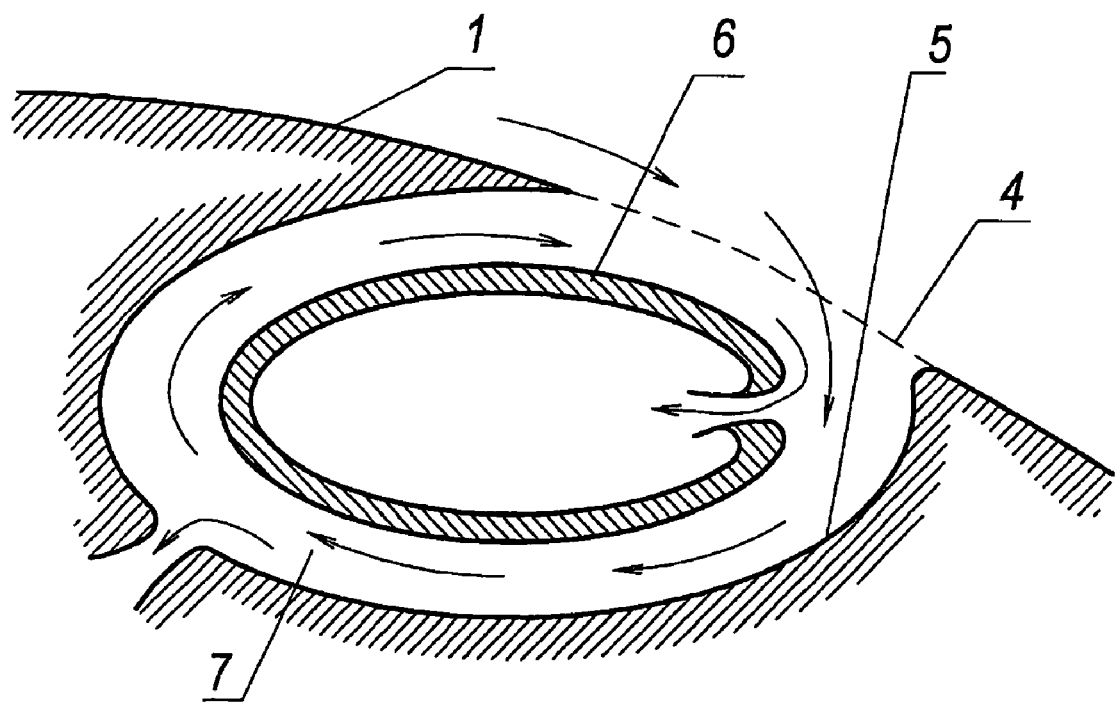
FIG. 2 illustrates a cross section of a cavity provided with a central body, and a diagram of air flows.

In realization of a method of operation, blades (or vanes of turbine or fan and etc.), that is the same in the present case) 1 are radially mounted around a shaft 2 of a rotor 3. A blade 1 is produced in the form of a wing with a thick airfoil profile, and a vortex system for controlling a boundary layer, comprising slotted holes 4 embodied along the blade, is provided on a surface of the blade 1—on a side opposite to an incoming air flow. Cavities 5 are embodied under said holes 4 along the latter, each cavity being provided (or not provided —depending upon an embodiment of the blade) with a central longitudinal hollow body 6 forming an annular channel 7 in each cavity to generate a vortex-like flow by the incoming air flow in said channel. Discharge of the sucked medium from the cavities 5 and the central bodies 6 is carried out by means of branch channels 8 that may be in communication with environment or a suction member. Partitions (not shown) that divide a cavity 5 into several portions are mounted within the cavities 5. Ribs 9 are mounted at an external surface of the blade 1 along the incoming flow (see FIG. 3).

Figure 3:
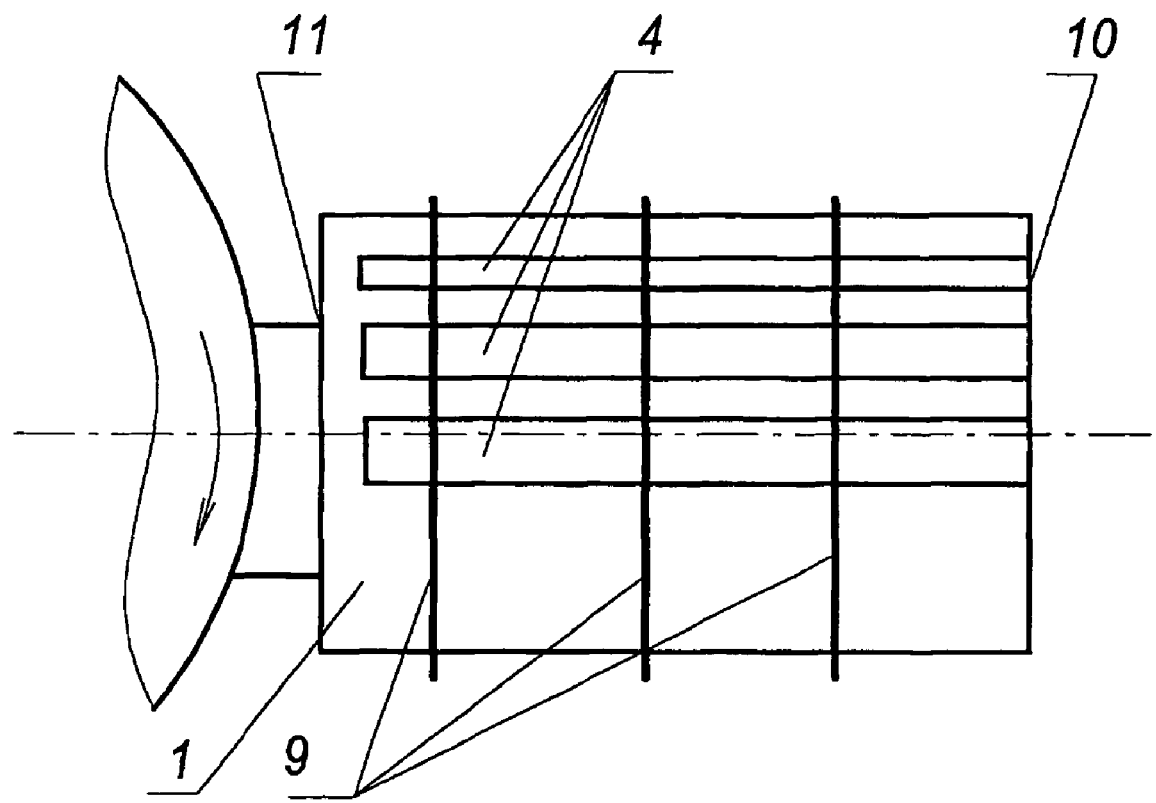
FIG. 3 illustrates a view of a blade from a side of slotted holes provided with ribs that limit the flowing-off of the air flow along the blade.

The branch channels 8 that may be in communication with a suction member, for example, a fan or an ejector (not shown in the drawings), or with environment on a side of an end 10 of the blade 1, or its shank 11 (see FIG. 3).

Air flow control members (not shown in the drawings) can be mounted at outlets of the cavities 5 and the central bodies 6 or at outlets of the branch channels 8.

Figure 4:
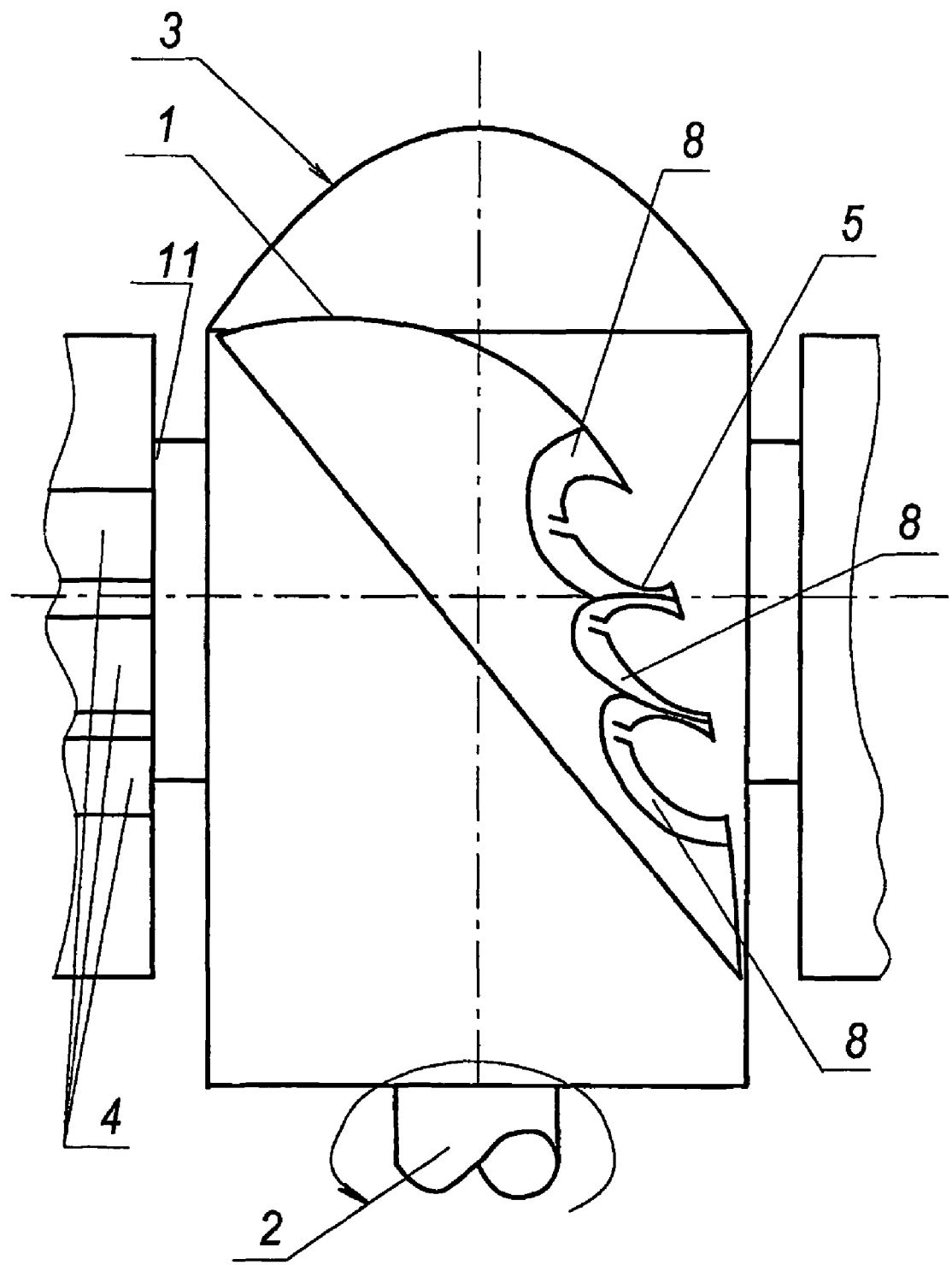
FIG. 4 illustrates a cross section of a blade according to its second embodiment.

In operation, the blades 1 mounted radially around the shaft 2 are driven into rotation. The boundary layer suction is carried out through the system of the slotted holes 4 and through the cavities 5 embodied under said holes 4 along the latter, each cavity being provided with a central longitudinal hollow body 6 (for the second embodiment, see FIG. 4, the cavities have no central bodies), said suction taking place at the blade surface on the opposite side with respect to the incoming air flow. As a result, the incoming air flow generates a vortex-like flow in each cavity 5 or in its annular channel 7. The air suction from the cavity 5 and the central bodies 6 is carried out through the branch channels 8 wherefrom the air is sucked and discharged outside of the blades 1. The flowing-off of the air flow along the cavities 5 and along external surfaces of the blades 1 is limited within the cavities by mounting partitions with a predetermined spacing, and on the external surface of the blade—by mounting ribs 9 with a predetermined spacing.

If intensification of operation is necessary, air may be blown into the vortex-like air flow of the cavity 5.

Control of the boundary layer suction mode can be carried out by mounting air flow control members at outlets of branch channels 8 or at outlets of cavities 5 and central bodies 6.

The invention claimed is:

1. A method for increasing a blade performance, comprising the steps of producing a blade in the form of a wing, and on a side of the blade that is opposite to an incoming air flow, carrying out the boundary layer suction through a system of slotted holes, characterized by: providing said blade with a thick airfoil profile, the air suction being carried out through system of slotted holes embodied along the blade and into cavities embodied under said holes along the latter and provided with a central longitudinal hollow body in each cavity, said body forming an annular channel in each cavity to generate a vortex-like flow by the incoming air flow in said channel; carrying out the air suction from the cavity and central bodies through branch channels; and discharging air from the branch channels outside of the blade, wherein the flowing-off of the air flow along the cavities and along the blade is limited within the cavities by mounting partitions and on an external surface of the blade—by mounting ribs.

2. A method for increasing a blade performance according to claim 1, characterized by suction of air out from the branch channels by means of a suction member.

3. A method for increasing a blade performance according to claim 1, characterized by blowing air into the vortex-like flow into the cavities.

4. A method for increasing a blade performance according to claim 1, characterized by controlling the air suction by mounting air flow control members at outlets of cavities and central bodies or at outlets of branch channels.

5. A method for increasing a blade performance, comprising the steps of producing a blade in the form of a wing, and on a side of the blade that is opposite to an incoming air flow, carrying out the boundary layer suction through a system of slotted holes, characterized by: providing said blade with a thick airfoil profile, the air suction being carried out through system of slotted holes embodied along the blade and into cavities embodied under said holes along the latter to generate a vortex-like flow by the incoming air flow in said cavities; carrying out the air suction from the cavities through branch channels; and discharging air from the branch channels outside of the blade, wherein the flowing-off of the air flow along the cavities and along the blade is limited within the cavities by mounting partitions and on an external surface of the blade—by mounting ribs.

6. A method for increasing a blade performance according to claim 5, characterized by suction of air out from the branch channels by means of a suction member.

7. A method for increasing a blade performance according to claim 5, characterized by blowing air into the vortex-like flow in the cavities.

8. A method for increasing a blade performance according to claim 5, characterized by controlling the air suction by mounting air flow control members at outlets of cavities or at outlets of branch channels.

* * * * *

UNITED STATES PATENT AND TRADEMARK OFFICE
CERTIFICATE OF CORRECTION

PATENT NO.        : 7,520,722 B2
APPLICATION NO.   : 10/582019
DATED             : April 21, 2009
INVENTOR(S)       : Shchukin et al.

It is certified that error appears in the above-identified patent and that said Letters Patent is hereby corrected as shown below:

Title Page;
Under Section (75) - replace inventor name to correct spelling "Ilya Lvovich Shchukin"

Signed and Sealed this

Eleventh Day of August, 2009

David J. Kappos
*Director of the United States Patent and Trademark Office*